United States Patent
Lv et al.

(10) Patent No.: US 12,341,746 B2
(45) Date of Patent: Jun. 24, 2025

(54) DOMAIN NAME RESOLUTION METHOD, DEVICE, AND MEDIUM BASED ON CONTENT DELIVERY NETWORK

(71) Applicant: Beijing Volcano Engine Technology Co., Ltd., Beijing (CN)

(72) Inventors: Yifan Lv, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/731,061

(22) Filed: May 31, 2024

(65) Prior Publication Data

US 2024/0406136 A1 Dec. 5, 2024

(30) Foreign Application Priority Data

Jun. 2, 2023 (CN) .......................... 202310652533.7

(51) Int. Cl.
*G06F 13/00* (2006.01)
*H04L 61/4511* (2022.01)
*H04L 101/355* (2022.01)

(52) U.S. Cl.
CPC .... *H04L 61/4511* (2022.05); *H04L 2101/355* (2022.05)

(58) Field of Classification Search
CPC .......................... H04L 61/4511; H04L 2101/355
(Continued)

(56) References Cited

U.S. PATENT DOCUMENTS 10,069,787 B2 * 9/2018 Holloway ............ H04L 61/4552
10,757,065 B2 * 8/2020 Chen ....................... H04L 61/35
(Continued)

FOREIGN PATENT DOCUMENTS

CN 105681491 A 6/2016
CN 108574744 A 9/2018
(Continued)

OTHER PUBLICATIONS

International Patent Application No. PCT/CN2024/094722; Int'l Written Opinion and Search Report; dated Sep. 17, 2024; 8 pages.
(Continued)

*Primary Examiner* — Kenneth R Coulter
(74) *Attorney, Agent, or Firm* — BakerHostetler

(57) ABSTRACT

The present disclosure provides a domain name resolution method, apparatus, device, and medium based on a content delivery network. The domain name resolution method, applicable to an authoritative domain name system, comprises: receiving a domain name to be resolved transmitted by a local domain name system; determining a target hosted zone based on a domain name suffix of the domain name to be resolved, wherein a plurality of first sub-domain names are recorded in the target hosted zone; matching the domain name to be resolved with the plurality of first sub-domain names, and determining a first sub-domain name that matches the domain name to be resolved; determining a resolution result of the domain name to be resolved based on the first sub-domain name that matches the domain name to be resolved, and feeding back the resolution result to the local domain name system, wherein the local domain name system is configured to transmit the resolution result to a client.

20 Claims, 9 Drawing Sheets

(58) Field of Classification Search
USPC .................................................. 709/245, 203
See application file for complete search history.

(56) References Cited

U.S. PATENT DOCUMENTS

2015/0281168 A1    10/2015   Holloway et al.
2019/0222551 A1     7/2019   Chen et al.

FOREIGN PATENT DOCUMENTS

| CN | 109936632 A | 6/2019 | |
|---|---|---|---|
| CN | 111200667 A | 5/2020 | |
| CN | 115643234 A | 1/2023 | |
| CN | 116708365 A | 9/2023 | |
| WO | WO-2021120355 A1 * | 6/2021 | ........... H04L 61/103 |

OTHER PUBLICATIONS

European Patent Application No. 24179359.5; Extended Search Report; dated Oct. 18, 2024; 9 pages.

* cited by examiner

DOMAIN NAME RESOLUTION METHOD, DEVICE, AND MEDIUM BASED ON CONTENT DELIVERY NETWORK

CROSS-REFERENCE TO RELATED ART

The present application claims priority from Chinese patent application No. 202310652533.7, entitled "DOMAIN NAME RESOLUTION METHOD, APPARATUS, DEVICE, AND MEDIUM BASED ON CONTENT DELIVERY NETWORK", filed on Jun. 2, 2023, which is hereby incorporated by reference in its entirety.

TECHNICAL FIELD

The present disclosure relates to the field of domain name resolution and, more particularly, relates to a domain name resolution method, apparatus, device, and medium based on a content delivery network.

BACKGROUND

In Content Delivery Networks (CDNs), it is a common technique to resolve a domain name by a Domain Name System (DNS) to realize access by a user from neighborhood.

SUMMARY

The present disclosure provides a domain name resolution method, apparatus, device, and medium based on a content delivery network.

According to a first aspect, the present disclosure provides a domain name resolution method, applied to an authoritative domain name system, the method comprising:
  receiving a domain name to be resolved transmitted by a local domain name system, wherein the domain name to be resolved is transmitted by a client to the local domain name system;
  determining a target hosted zone based on a domain name suffix of the domain name to be resolved, wherein a plurality of first sub-domain names are recorded in the target hosted zone;
  matching the domain name to be resolved with the plurality of first sub-domain names, and determining a first sub-domain name that matches the domain name to be resolved; and
  determining a resolution result of the domain name to be resolved based on the first sub-domain name that matches the domain name to be resolved, and feeding back the resolution result to the local domain name system, wherein the local domain name system is configured to transmit the resolution result to the client.

According to a second aspect, the present disclosure provides a domain name resolution apparatus, applied to an authoritative domain name system, the apparatus comprising:
  a reception module for receiving a domain name to be resolved transmitted by a local domain name system, wherein the domain name to be resolved is transmitted by a client to the local domain name system;
  a first execution module for determining a target hosted zone based on a domain name suffix of the domain name to be resolved, wherein a plurality of first sub-domain names are recorded in the target hosted zone;
  a second execution module for matching the domain name to be resolved with the plurality of first sub-domain names, and determining a first sub-domain name that matches the domain name to be resolved;
  a first feedback module for determining a resolution result of the domain name to be resolved based on the first sub-domain name that matches the domain name to be resolved, and feeding back the resolution result to the local domain name system, wherein the local domain name system is configured to transmit the resolution result to the client.

According to a third aspect, the present disclosure provides an electronic device, comprising: a memory and a processor, the memory and the processor being communicatively connected to each other, the memory having stored therein computer instructions, and the processor executing the computer instructions to perform the domain name resolution method according to the first aspect or any one of embodiments corresponding thereto.

According to a fourth aspect, the present disclosure provides a computer-readable storage medium with computer instructions stored thereon for causing a computer to perform the domain name resolution method according to the first aspect or any one of embodiments corresponding thereto.

DESCRIPTION OF THE DRAWINGS

In order to more clearly illustrate the embodiments of the present disclosure or the technical solutions in the prior art, a brief introduction will be given below for the drawings required to be used in the description of the embodiments or the prior art. It is obvious that, the drawings described below are some embodiments of the present disclosure. For a person with ordinary skill in the art, he or she may also acquire other drawings according to such drawings, without spending any inventive effort.

DETAILED DESCRIPTION OF THE EMBODIMENTS

To make the objectives, technical solutions and advantages of the embodiments of the present disclosure clearer, the technical solutions in the embodiments of the present disclosure will be clearly and completely described below with reference to the drawings in the embodiments of the present disclosure, and apparently the described embodiments are some, but not all embodiments of the present disclosure. All other embodiments, which can be derived by a person skilled in the art based on the embodiments disclosed herein without spending any inventive effort, shall fall within the protection scope of the present disclosure.

In the related prior art, in an authoritative DNS, a corresponding Canonical Name (CNAME) type is configured for an externally exposed domain name to point it to other domain name. The domain name pointed to by the CNAME can be directly configured as other record type such as A/AAAA, and it can also continue to point to a next level of CNAME to achieve second-level scheduling, third-level scheduling, . . . . When a Local DNS attempts to acquire original domain name resolution, the authoritative DNS will return a CNAME, and the Local DNS will continue querying iteratively until a complete resolution link is acquired.

Figure 1:
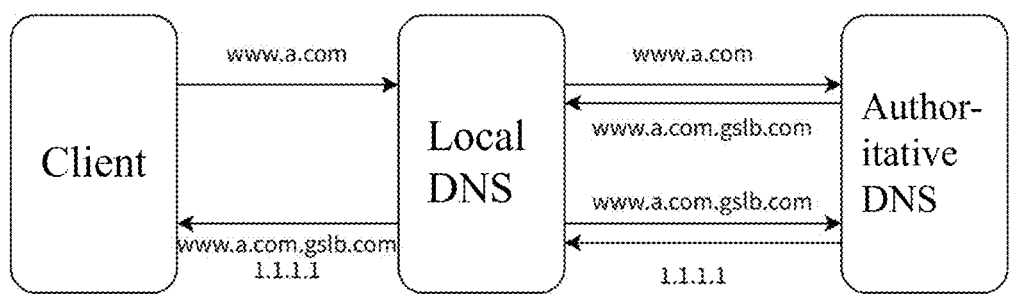
FIG. 1 is a schematic diagram of a domain name resolution interaction in the related art.

For example, the domain name resolution process can be as shown in FIG. 1, where a client transmits a domain name to be resolved (e.g., www.a.com) to a Local DNS, which transmits a query to an authoritative DNS according to the received domain name to be resolved so that resolution is performed by the authoritative DNS. The authoritative DNS performs resolution based on the received domain name to be resolved and a built-in CNAME record to obtain a mapping domain name (www.a.com.gslb.com) to which the domain name to be resolved points, and feeds back the mapping domain name to the Local DNS. Based on the received mapping domain name, the Local DNS again transmits a query to the authoritative DNS, and transmits the mapping domain name to the authoritative DNS to determine a mapping address. The authoritative DNS performs a query again based on the received mapping domain name to obtain the mapping address (1.1.1.1) corresponding to the mapping domain name, and transmits the mapping address to the Local DNS. The Local DNS uses the mapping domain name and the mapping address as a resolution result of the domain name to be resolved, and then transmits the resolution result to the client to thereby complete the resolution.

As can be seen from the above implementation process, the Local DNS needs to perform multiple iterative queries with the authoritative DNS in order to obtain the resolution result after the domain name resolution, which will increase the response delay of domain name query and also lead to the probability of timeout.

In view of this, an embodiment of the present disclosure provides a domain name resolution method applied to an authoritative domain name system, comprising: receiving a domain name to be resolved transmitted by a local domain name system, wherein the domain name to be resolved is transmitted by a client to the local domain name system; determining a target hosted zone based on a domain name suffix of the domain name to be resolved, wherein a plurality of first sub-domain names are recorded in the target hosted zone; matching the domain name to be resolved with the plurality of first sub-domain names, and determining a first sub-domain name that matches the domain name to be resolved; determining a resolution result of the domain name to be resolved based on the first sub-domain name that matches the domain name to be resolved, and feeding back the resolution result to the local domain name system, wherein the local domain name system is configured to transmit the resolution result to the client. The target hosted zone is determined through the suffix of the domain name to be resolved, and then based on the plurality of first sub-domain names in the target hosted zone, the resolution result of the domain name to be resolved is obtained and transmitted to the local domain name system, such that the local domain name system only needs to query the authoritative domain name system once to obtain the resolution result, which thus effectively improves the efficiency of query, and greatly reduces the network overhead and response delay.

In accordance with an embodiment of the present disclosure, there is provided a domain name resolution method embodiment. It is to be noted that, the steps illustrated in the flowchart of the drawings may be performed in a computer system such as a set of computer-executable instructions, and that, although a logical order is illustrated in the flowchart, the steps illustrated or described may be performed in a different order from the order here in some instances.

Figure 2:
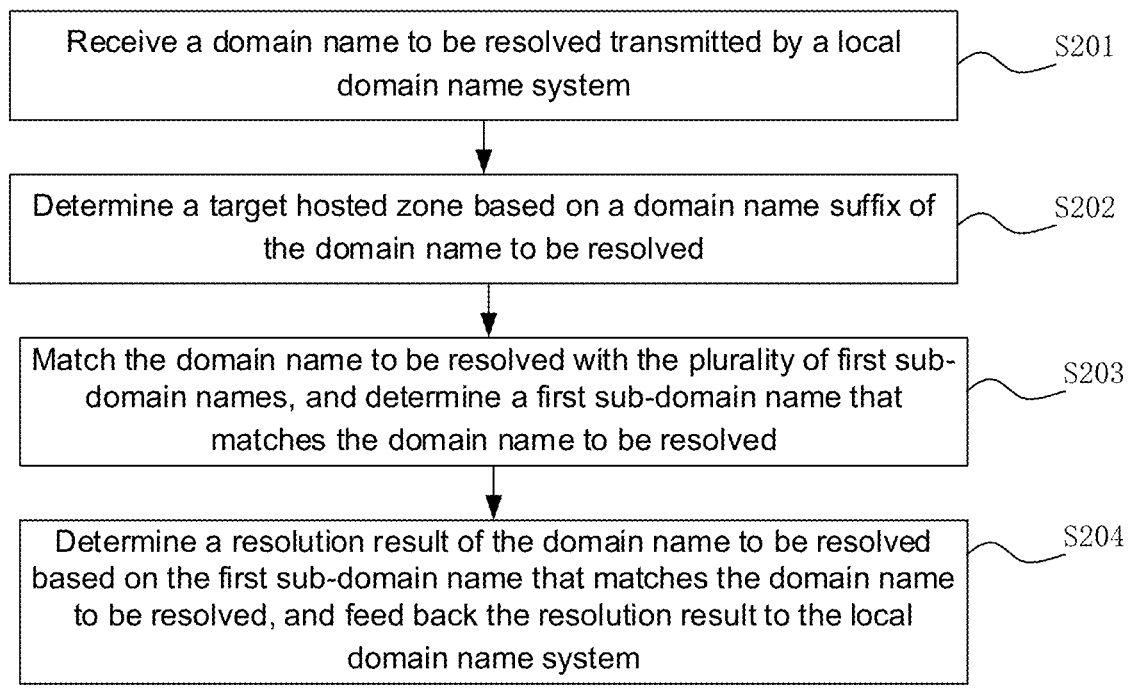
FIG. 2 is a flowchart diagram of a domain name resolution method according to an embodiment of the present disclosure.

In the present embodiment, a domain name resolution method is provided, which may be applied to an authoritative domain name system deployed on an electronic device or a server. FIG. 2 is a flowchart diagram of a domain name resolution method according to an embodiment of the present disclosure. As shown in FIG. 2, the flow includes the following steps:

Step S201, receiving a domain name to be resolved transmitted by a local domain name system.

In the embodiment of the present application, the domain name to be resolved is transmitted by a client to the local domain name system. The domain name to be resolved can be any domain name that the client needs to request access to. For example, the domain name to be resolved may be www.a.com.

Step S202, determining a target hosted zone based on a domain name suffix of the domain name to be resolved.

In the embodiment of the present disclosure, multiple hosted zones are included in an authoritative DNS, a plurality of first sub-domain names are recorded in each hosted zone, and each first sub-domain name is a complete sub-domain name. That is, in the authoritative DNS, domain name resolution is performed using CNAME.

In order to facilitate quick query, the target hosted zone is determined from the authoritative DNS based on the domain name suffix of the domain name to be resolved, so that domain name resolution is performed through the plurality of first sub-domain names in the target hosted zone, thereby improving the efficiency of query.

Step S203, matching the domain name to be resolved with the plurality of first sub-domain names, and determining a first sub-domain name that matches the domain name to be resolved.

In the embodiment of the present disclosure, since each first sub-domain name is a complete sub-domain name, the domain name to be resolved is matched with each of the first sub-domain names in the target hosted zone, and the first sub-domain name that matches the domain name to be resolved is determined from the plurality of first sub-domain names. Thus, it can be determined that a resolution result can be directly obtained through the target hosted zone.

Step S204, determining a resolution result of the domain name to be resolved based on the first sub-domain name that matches the domain name to be resolved, and feeding back the resolution result to the local domain name system.

In the embodiment of the present disclosure, based on the first sub-domain name that matches the domain name to be resolved, the resolution result of the domain name to be resolved can be obtained quickly, and then the resolution result is fed back to the local domain name system, so that the local domain name system can directly transmit the resolution result to the client without the need to iteratively query the authoritative DNS again, thereby effectively improving the efficiency of domain name resolution and quickly completing domain name query.

The domain name resolution method provided in the present embodiment is capable of effectively reducing the number of times that the local domain name system makes an inquiry with the authoritative DNS such that the local domain name system can obtain the resolution result to be transmitted to the client by inquiring the authoritative DNS once, which thus greatly reduces the network overhead and response delay, thereby effectively improving the efficiency of domain name resolution, quickly completing the domain name query, and facilitating improvement of the server performance.

Figure 3:
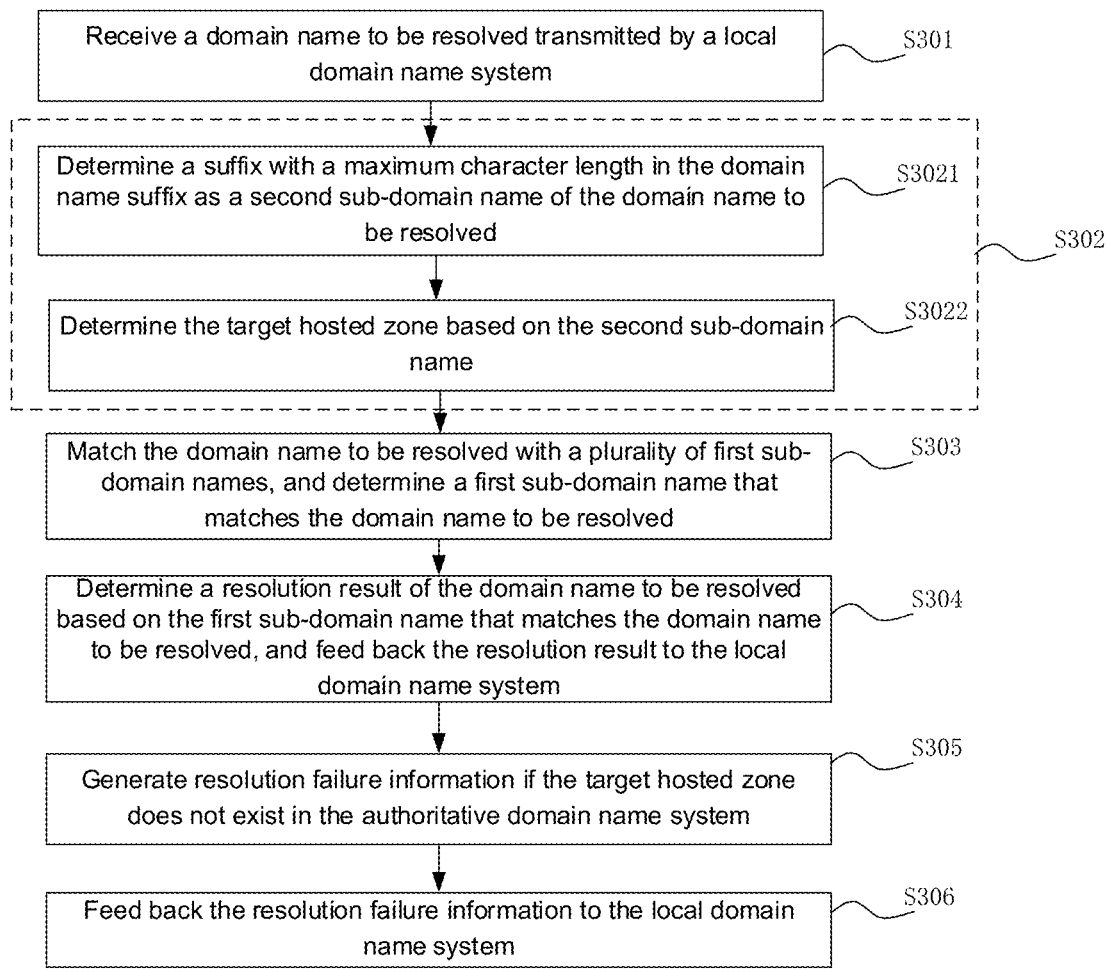
FIG. 3 is a flowchart diagram of another domain name resolution method according to an embodiment of the present disclosure.

In the present embodiment, a domain name resolution method is provided, which may be applied to an authoritative domain name system deployed on an electronic device or a server. FIG. 3 is a flowchart diagram of a domain name resolution method according to an embodiment of the present disclosure. As shown in FIG. 3, the flow includes the following steps:

Step S301, receiving a domain name to be resolved transmitted by a local domain name system. Please refer to step S201 of the embodiment as shown in FIG. 2 for details, which is not repeated here.

Step S302, determining a target hosted zone based on a domain name suffix of the domain name to be resolved.

Specifically, the Step S302 includes:

Step S3021, determining a suffix with a maximum character length in the domain name suffix as a second sub-domain name of the domain name to be resolved.

In the embodiment of the present disclosure, in order to clarify the query direction and improve the query efficiency, the suffix with a maximum character length in the domain name suffix is determined as the second sub-domain name of the domain name to be resolved, in order that the longest suffix match principle can be satisfied when the target hosted zone is subsequently determined.

Step S3022, determining the target hosted zone based on the second sub-domain name.

In the embodiment of the present disclosure, in an authoritative DNS, multiple hosted zones are recorded in the form of a tree. For example, Trie Tree or Red Black Tree can be used for recording. In order to improve the efficiency of matching, the target hosted zone is determined from the multiple hosted zones of the authoritative DNS based on the second sub-domain name.

In some optional embodiments, the Step S3022 includes:

Step a, in response to determining that the hosted zone corresponding to the second sub-domain name exists in the authoritative domain name system, determining a hosted zone corresponding to the second sub-domain name as the target hosted zone;

Step b, in response to determining that no hosted zone corresponding to the second sub-domain name exists in the authoritative domain name system, determining a third sub-domain name based on the domain name suffix of the domain name to be resolved; and determining the target hosted zone based on the third sub-domain name.

In this method, if no hosted zone corresponding to the second sub-domain name exists in the authoritative domain name system, it indicates that the authoritative DNS is unable to resolve the domain name to be resolved according to the second sub-domain name. In order to avoid the occurrence of missing resolution, the third sub-domain name is determined based on the domain name suffix of the domain name to be resolved, and then the target hosted zone is determined based on the third sub-domain name. A character length of a domain name suffix of the third sub-domain name is less than a character length of a domain name suffix of the second sub-domain name. For example, the third sub-domain name can be determined based on the domain name suffix of the domain name to be resolved by shortening the character length of the suffix to be queried bit by bit, thereby improving the accuracy of resolution.

Step S303, matching the domain name to be resolved with a plurality of first sub-domain names, and determining a first sub-domain name that matches the domain name to be resolved. Please refer to Step S203 of the embodiment as shown in FIG. 2 for details, which would not be repeated here.

Step S304, determining a resolution result of the domain name to be resolved based on the first sub-domain name that matches the domain name to be resolved, and feeding back the resolution result to the local domain name system.

In some optional embodiments, in response to determining that the authoritative domain name system has multiple levels, a resolution result from the last level of the authoritative domain name system is fed back to the local domain name system, thereby achieving the purpose of hiding a query link to hide technical details from the user.

Step S305, in response to determining that the target hosted zone does not exist in the authoritative domain name system, generating resolution failure information.

In the embodiment of the present disclosure, if the target hosted zone does not exist in the authoritative DNS, it indicates that the authoritative DNS is unable to resolve the domain name to be resolved, and thus, the resolution failure information is generated. For example, the resolution failure information may be REFUSED, indicating that the target hosted zone does not exist.

Step S306, feeding back the resolution failure information to the local domain name system.

In the embodiment of the present disclosure, the resolution failure information is fed back to the local domain name system, so that the local domain name system re-determines the authoritative DNS according to the resolution failure information, thereby improving the success rate of domain name resolution. Alternatively, the local domain name system informs the client of the resolution failure, so that the client can re-determine whether the domain name to be resolved is correct.

The domain name resolution method provided in the present embodiment can enable the authoritative DNS to flexibly determine the target hosted zone, such that when performing domain name resolution subsequently, both the efficiency of resolution and the success rate of domain name resolution can be improved.

In some optional embodiments, the following manner is used to determine a first sub-domain name that matches the domain name to be resolved: in the target hosted zone, matching the domain name to be resolved with the plurality of first sub-domain names; in response to determining that there exists a target sub-domain name among the plurality of first sub-domain names that matches the domain name to be resolved, using the target sub-domain name as the first sub-domain name that matches the domain name to be resolved.

Figure 4:
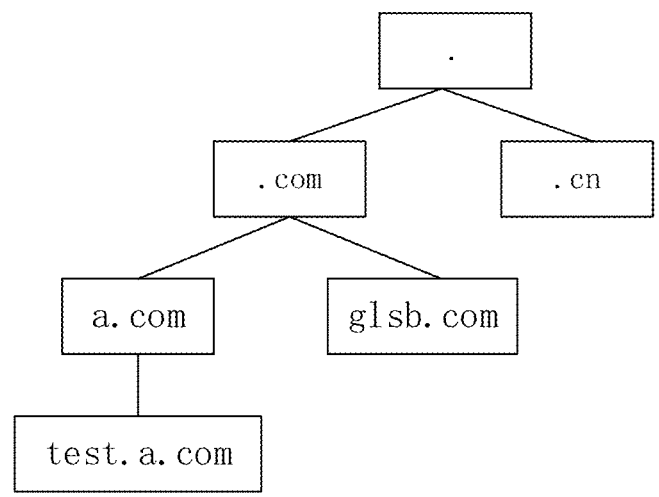
FIG. 4 is a schematic diagram of a hosted zone recording manner according to an embodiment of the present disclosure.

In an implementation scenario, the manner of recording various hosted zones within an authoritative DNS can be as shown in FIG. 4. In FIG. 4, ".", ".com", ".cn" represent respective hosted zones; "a.com" and "glsb.com" are a plurality of first sub-domain names of "com"; and "test.a.com" is a first sub-domain name of "a". If ".com" is a target hosted zone, "www.a.com" is matched with "a.com", "glsb.com" and "test.a.com", respectively, and it can be determined that "test.a.com" is a target sub-domain name that matches "www.a.com". Thus, "test.a.com" is used as a first sub-domain name that matches the domain name to be resolved.

In response to determining that there exists no target sub-domain name among the plurality of first sub-domain names that matches the domain name to be resolved, the target hosted zone is re-determined in order to improve the accuracy of resolution. In some optional implementation scenarios, if there is still no target sub-domain name that matches the domain name to be resolved after the target hosted zone is re-determined, the target hosted zone is continually re-determined until a valid target sub-domain name is obtained. In order to avoid an excessively long resolution time, the number of times that the target hosted zone is determined is counted. If the target sub-domain name is still not determined after a specified number of times is reached, a prompt message that the domain name does not exist is generated and transmitted to the local domain name system in order to avoid a timeout response. The content of the prompt message may be: NXDOMAIN.

In other optional embodiments, in the target hosted zone, a mapping address corresponding to each first sub-domain name is also recorded. Thus, after the first sub-domain name that matches the domain name to be resolved is determined, a target mapping address corresponding to the target sub-domain name can be determined based on a preset correspondence between the plurality of first sub-domain names and mapping addresses, wherein the target sub-domain name is the first sub-domain name that matches the domain name to be resolved. For the sake of simplicity, in the following, the "first sub-domain name that matches the domain name to be resolved" is uniformly replaced with the "target sub-domain name". The target sub-domain name and the target mapping address are used as a resolution result of the domain name to be resolved, and thus, the purpose of improving the query efficiency and the success rate is achieved.

Figure 5:
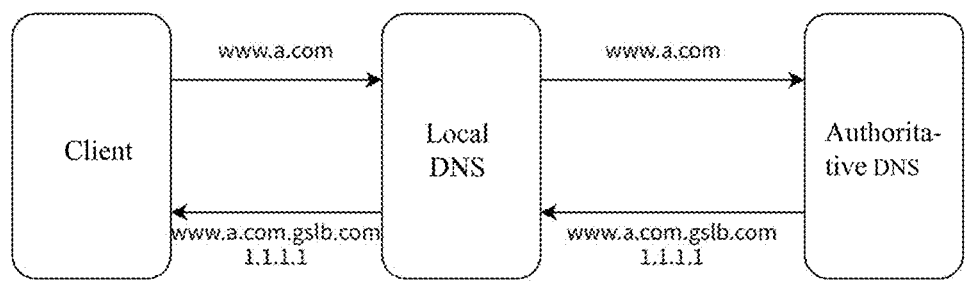
FIG. 5 is a schematic diagram of a domain name resolution interaction according to an embodiment of the present disclosure.

For example, the domain name resolution process is as shown in FIG. 5. In FIG. 5, a local domain name system receives a domain name to be resolved, "www.a.com", transmitted from a client, and the local domain name system transmits it to an authoritative DNS for inquiry and resolution. After the authoritative DNS completes the resolution, a resolution result, i.e., a target sub-domain name ("www.a.com.glsb.com") and a target mapping address ("1.1.1.1"), is obtained. The "www.a.com.glsb.com" and "1.1.1.1" are fed back to the local domain name system. The local domain name system feeds back the obtained "www.a.com.glsb.com" and "1.1.1.1" to the client.

In yet other optional embodiments, the authoritative DNS may be understood as a vendor-provided domain name system, and some sub-domain names may be confidential and need to be protected. Therefore, a plurality of sub-domain names that need to be hidden can be configured in advance, so that the sub-domain names can be hidden when resolution results are fed back. Therefore, after a target sub-domain name is obtained, whether the target sub-domain name is a domain name to be hidden is identified. In response to determining that the target sub-domain name is not a domain name to be hidden, the target sub-domain name and target mapping address are used as a resolution result of the domain name to be resolved, so that the client can clearly determine the domain name to which the domain name to be resolved points after the resolution.

Figure 6:
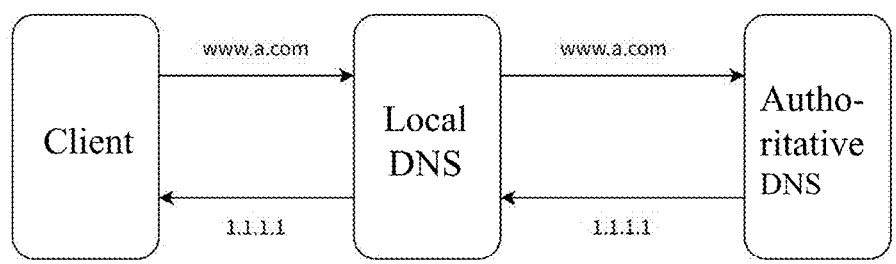
FIG. 6 is a schematic diagram of another domain name resolution interaction according to an embodiment of the present disclosure.

For example, the domain name resolution process is as shown in FIG. 6. In FIG. 6, a local domain name system receives a domain name to be resolved, "www.a.com", transmitted from a client, and the local domain name system transmits it to an authoritative DNS for inquiry and resolution. After the authoritative DNS completes the resolution, a target sub-domain name "www.a.com.glsb.com" and a target mapping address "1.1.1.1" are obtained. In response to identifying the "www.a.com.glsb.com" as a domain name to be hidden, the "www.a.com.glsb.com" is hidden, and the "1.1.1.1" is fed back to the local domain name system. The local domain name system feeds back the obtained "1.1.1.1" to the client.

In some examples, in response to identifying the target sub-domain name is a domain name to be hidden, the target sub-domain name is hidden and the target mapping address is used as a resolution result of the domain name to be resolved, which can effectively protect the target sub-domain name from being leaked, and thus can achieve the purpose of hiding technical details from the user so that the user will not feel the existence of CNAME link during the domain name resolution process.

Figure 7:
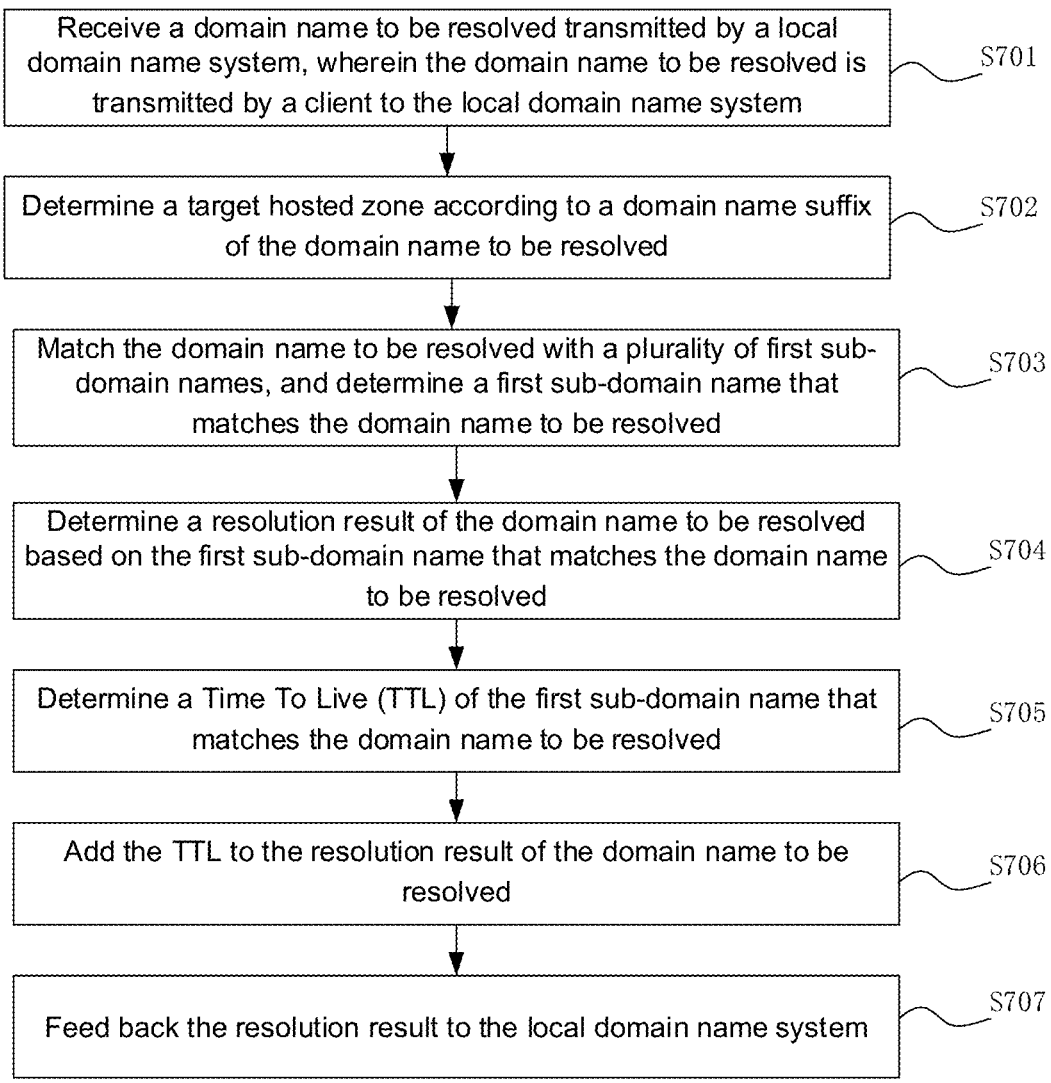
FIG. 7 is a flowchart diagram of yet another domain name resolution method according to an embodiment of the present disclosure.

In the present embodiment, a domain name resolution method is provided, which may be applied to an authoritative domain name system deployed on an electronic device or a server. FIG. 7 is a flowchart diagram of a domain name resolution method according to an embodiment of the present disclosure. As shown in FIG. 7, the flow includes the following steps:

Step S701, receiving a domain name to be resolved transmitted by a local domain name system, wherein the domain name to be resolved is transmitted by a client to the local domain name system.

Step S702, determining a target hosted zone based on a domain name suffix of the domain name to be resolved.

Step S703, matching the domain name to be resolved with a plurality of first sub-domain names, and determining a first sub-domain name that matches the domain name to be resolved.

Step S704, determining a resolution result of the domain name to be resolved based on the first sub-domain name that matches the domain name to be resolved.

Step S705, determining a Time To Live (TTL) of the first sub-domain name that matches the domain name to be resolved.

In the present embodiment of the present disclosure, in order to guarantee the validity of accessing, by the client, the first sub-domain name that matches the domain name to be resolved (the target sub-domain name), a Time To Live (TTL) of the first sub-domain name that matches the domain name to be resolved is determined.

In some optional embodiments, in response to determining that the target sub-domain name includes a plurality of matching domain names, a minimum value of TTLs of the matching domain names is used as the TTL of the target sub-domain name, which is helpful for guaranteeing the validity of the target sub-domain name to enable the client to successfully access the target sub-domain name. For example, if the TTLs of the matching domain names are respectively 600, 300 and 400, 300 is used as the TTL of the plurality of matching domain names. That is, 300 is used as the TTL of the target sub-domain name.

Step S706, adding the TTL to the resolution result of the domain name to be resolved.

Step S707, feeding back the resolution result to the local domain name system.

In the embodiment of the present disclosure, the resolution result in which the TTL is added is fed back to the local domain name system, so that the local domain name system can feed back the TTL of the target sub-domain name to the client concurrently to enable the client to clearly determine an effective access time of the target sub-domain name, which facilitates improving the use experience of the client user.

In some optional implementation scenarios, taking the TTL of the target sub-domain name "www.a.com.glsb.com" being 300 as an example, if the target sub-domain name is not a domain name to be hidden, the resolution result includes: "www.a.com.glsb.com", "1.1.1.1" (the target mapping address of the target sub-domain name), and TTL 300. If the target sub-domain name is a domain name to be hidden, the resolution result includes: "1.1.1.1" and TTL 300.

The domain name resolution method provided by the present embodiment can speed up the query and improve the success rate, and can also inform the client of the TTL of the target sub-domain name, which can effectively assist a client user in accessing the target sub-domain name within an effective time, thereby helping to enhance the user experience of the client user.

In some optional embodiments, it is possible to set domain names that require domain name resolution acceleration according to needs. That is, which domain names require the execution of the domain name resolution method provided by the present disclosure are configured in the authoritative DNS in advance. In response to determining that a domain name to be resolved received by the authoritative DNS is a domain name that is pre-configured to require domain name resolution acceleration, the domain name resolution method provided in the present disclosure is performed. In response to determining that the domain name to be resolved received by the authoritative DNS is not a domain name that is pre-configured to require domain name resolution acceleration, a conventional resolution method can be used to perform resolution. Thus, the manner of domain name resolution acceleration is more flexible.

In some examples, to make the manner of domain name acceleration and domain name hiding more flexible, the following configuration may be performed in the authoritative DNS in advance: field control is added in each hosted zone, and the entire link follows the settings of a starting-point hosted zone. That is, if acceleration is configured for the starting-point hosted zone, hosted zones of each subsequent level are accelerated. If the starting point one of the hosted zones is configured to be hidden, all links within the hosted zones are hidden.

In some optional application scenarios, the domain name resolution process performed by the authoritative DNS may be as follows: receiving a domain name to be resolved; determining a target hosted zone corresponding to the domain name to be resolved; determining whether the target hosted zone is a domain name that requires domain name resolution acceleration; in response to determining that the target hosted zone is not a domain name that requires domain name resolution acceleration, performing resolution using a conventional resolution method, and feeding back a resolution result to the local domain name system; in response to determining that the target hosted zone is a domain name that requires domain name resolution acceleration, querying a target sub-domain name in the target hosted zone; if the target sub-domain name is not found, feeding back NXDOMAIN to the local domain name system; if the target sub-domain name is found, determining whether the target sub-domain name is a domain name to be hidden; if the target sub-domain name is not a domain name to be hidden, using the target sub-domain name, target mapping address and Time To Live as a resolution result, and feeding back the resolution result to the local domain name system; and if the target sub-domain name is a domain name to be hidden, using the target mapping address and Time To Live as a resolution result, and feeding back the resolution result to the local domain name system.

In other optional application scenarios, in the process of performing domain name resolution by the authoritative DNS, if the authoritative DNS does not determine a target hosted zone corresponding to the domain name to be resolved, the resolution is performed using a conventional resolution method, and a resolution result is fed back to the local domain name system.

In the present embodiment, there is further provided a domain name resolution apparatus, which is configured to implement the above embodiments and preferred embodiments, and the contents that have already been described would not be repeated here. As used below, the term "module" may be a combination of software and/or hardware that implements predetermined functions. Although the apparatus described in the embodiments below are preferably implemented in software, an implementation in hardware or a combination of software and hardware is also possible and can be contemplated.

Figure 8:
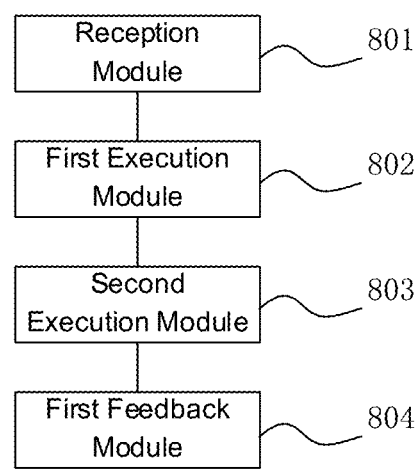
FIG. 8 is a block diagram of a domain name resolution apparatus according to an embodiment of the present disclosure.

The present embodiment provides a domain name resolution apparatus, applied to an authoritative domain name system, as shown in FIG. 8, comprising:

a reception module 801 for receiving a domain name to be resolved transmitted by a local domain name system, wherein the domain name to be resolved is transmitted by a client to the local domain name system;

a first execution module 802 for determining a target hosted zone based on a domain name suffix of the domain name to be resolved, wherein a plurality of first sub-domain names are recorded in the target hosted zone;

a second execution module 803 for matching the domain name to be resolved with the plurality of first sub-domain names, and determining a first sub-domain name that matches the domain name to be resolved;

a first feedback module 804 for determining a resolution result of the domain name to be resolved based on the first sub-domain name that matches the domain name to be resolved, and feeding back the resolution result to the local domain name system, wherein the local domain name system is configured to transmit the resolution result to the client.

In some optional embodiments, the first execution module 802 comprises:

a domain name determination unit for determining a suffix with a maximum character length in the domain name suffix as a second sub-domain name of the domain name to be resolved; and a hosted zone determination unit for determining the target hosted zone based on the second sub-domain name.

In some optional embodiments, the hosted zone determination unit comprises:

a first determination unit for determining a hosted zone corresponding to the second sub-domain name as the target hosted zone in response to determining that the hosted zone corresponding to the second sub-domain name exists in the authoritative domain name system; and a second determination unit for: determining a third sub-domain name based on the domain name suffix of the domain name to be resolved in response to determining that no hosted zone corresponding to the second sub-domain name exists in the authoritative domain name system, wherein a character length of a domain name suffix of the third sub-domain name is less than a character length of a domain name suffix of the second sub-domain name; and determining the target hosted zone based on the third sub-domain name.

In some optional embodiments, the apparatus further comprises:

an information generation module for generating resolution failure information in response to determining that the target hosted zone does not exist in the authoritative domain name system; and a second feedback module for feeding back the resolution failure information to the local domain name system.

In some optional embodiments, the second execution module 803 comprises:

a first matching unit for: matching the domain name to be resolved with the plurality of first sub-domain names; and in response to determining that there exists a target sub-domain name among the plurality of first sub-domain names that matches the domain name to be resolved, using the target sub-domain name as the first sub-domain name that matches the domain name to be resolved; and an adjustment unit for re-determining the target hosted zone in response to determining that there exists no target sub-domain name among the plurality of first sub-domain names that matches the domain name to be resolved.

In some optional embodiments, the first feedback module 804 comprises:

an address determination unit for determining a target mapping address corresponding to the target sub-domain name based on a preset correspondence between the plurality of first sub-domain names and mapping addresses; and a result determination unit for using the target sub-domain name and the target mapping address as the resolution result of the domain name to be resolved.

In some optional embodiments, the result determination unit comprises:

an identification unit for identifying whether the target sub-domain name is a domain name to be hidden; and a first determination sub-unit for using the target sub-domain name and the target mapping address as the resolution result of the domain name to be resolved in response to determining that the target sub-domain name is not a domain name to be hidden.

In some optional embodiments, the apparatus further comprises:

a second determination sub-unit for: hiding the target sub-domain name in response to determining that the target sub-domain name is a domain name to be hidden; and using the target mapping address as the resolution result of the domain name to be resolved.

In some optional embodiments, the apparatus further comprises:

a time determination module for determining a Time To Live (TTL) of the target sub-domain name; and an updating module for adding the TTL to the resolution result of the domain name to be resolved.

In some optional embodiments, the time determination module comprises:

a time determination unit for, in response to determining that the target sub-domain name includes a plurality of matching domain names, using a minimum value of TTLs of the matching domain names as the TTL of the target sub-domain name.

In some optional embodiments, the first feedback module 804 comprises:

a feedback unit for feeding back a resolution result from the last level of the authoritative domain name system to the local domain name system in response to determining that the authoritative domain name system has multiple levels.

The domain name resolution apparatus in the present embodiment is presented in the form of functional units, where the units refer to ASIC circuits, processors and memory executing one or more software or fixed programs, and/or other devices that may provide the above functions.

Further functional descriptions of the above modules and units match the above corresponding embodiments, which would not be repeated here.

An embodiment of the present disclosure further provides an electronic device, comprising the domain name resolution apparatus as shown in FIG. 8.

Figure 9:
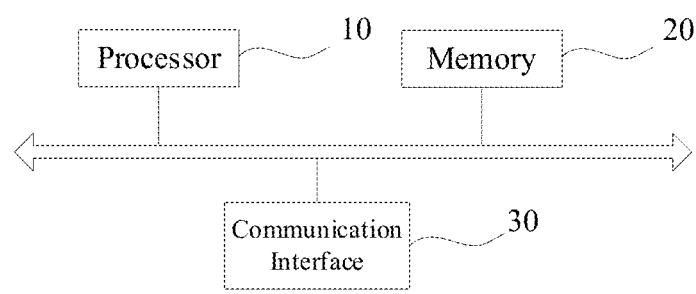
FIG. 9 is a schematic diagram of a hardware structure of an electronic device according to an embodiment of the present disclosure.

Please refer to FIG. 9, which is a schematic diagram of an electronic device provided in an optional embodiment of the present disclosure. As shown in FIG. 9, the electronic device comprises: one or more processors 10, a memory 20, and an interface for connecting various components, including a high-speed interface and a low-speed interface. The various components are communicatively connected to each other using different buses and may be mounted on a common mainboard or in other manners as desired. The processor may process instructions executed within the electronic device, including instructions stored in or on the memory to display graphical information of a GUI on an external input/output apparatus (such as a display device coupled to the interface). In some optional embodiments, multiple processors and/or multiple buses may be used, as desired, along with multiple memories. Likewise, multiple electronic devices may be connected, each device providing some of necessary operations (e.g., as an array of servers, a group of blade servers, or a multi-processor system). One processor 10 is taken as an example in FIG. 9.

The processor 10 may be a central processing unit, a network processor, or a combination thereof. The processor 10 may further include a hardware chip. The above hardware chip may be an application specific integrated circuit, a programmable logic device, or a combination thereof. The above programmable logic device may be a complex programmable logic device, a field-programmable logic gate array, general-purpose array logic, or any combination thereof.

The memory 20 stores instructions executable by at least one processor 10 to cause the at least one processor 10 to implement the method as shown in the above embodiments.

The memory 20 may include a program store and a data store, wherein the program store may store an operating system, an application program required for at least one function, and the like, and the storage data area may store data created according to the use of an electronic device for presentation of an applet page, etc. In addition, the memory 20 may include a high-speed random-access memory, and may also include a non-transitory memory, such as at least one magnetic disk storage device, a flash memory device, or other non-transitory solid-state storage device. In some alternative embodiments, the memory 20 optionally includes memories provided remotely relative to the processor 10, and these remote memories may be connected to the electronic device via a network. Examples of the above network includes, but are not limited to, the Internet, an enterprise intranet, a local area network, a mobile communication network and a combination thereof.

The memory 20 may include a volatile memory, such as a random access memory; the memory may also include a non-volatile memory, such as a flash memory, a hard disk, or a solid state disk; and the memory 20 may also include a combination of the above types of memories.

The electronic device further comprises an input apparatus 30 and an output apparatus 40. The processor 10, the memory 20, the input apparatus 30 and the output apparatus 40 may be connected via a bus or other means. In FIG. 9, connection via a bus is taken as an example.

The input apparatus 30 may receive input numeric or character information and generate key signal inputs related to user settings and functional control of the electronic device, such as a touch screen, keypad, mouse, trackpad, touch pad, indication stick, one or more mouse buttons, track ball, joystick, etc. The output apparatus 40 may include a display device, an auxiliary lighting device (e.g., an LED), a haptic feedback apparatus (e.g., a vibration motor), and the like. The above display device includes, but is not limited to, a liquid crystal display, a light emitting diode, a display, and a plasma display. In some optional embodiments, the display device may be a touch screen.

An embodiment of the present disclosure further provides a computer readable storage medium. The above method according to the embodiments of the present disclosure can be implemented in hardware, firmware, or implemented as computer code that can be recorded in a storage medium, or implemented as computer code that is downloaded over a network, originally stored in a remote storage medium or a non-transitory machine-readable storage medium and to be stored in a local storage medium. Thus, the method described here can be processed by software stored on a storage medium using a general-purpose computer, a dedicated processor, or programmable or dedicated hardware. The storage medium can be a magnetic disk, an optical disk, a read-only storage memory, a random-access storage memory, a flash memory, a hard disk or a solid-state disk. Further, the storage medium may also include a combination of the above types of memories. It will be appreciated that the computer, processor, microprocessor controller or programmable hardware includes a storage component that can store or receive software or computer code that, when accessed and executed by the computer, processor or hardware, implements the method illustrated in the above embodiments.

Although the embodiments of the present disclosure have been described with reference to the accompanying drawings, those skilled in the art may make various modifications and variations without departing from the spirit and scope of the present disclosure, and such modifications and variations all fall within the scope defined by the attached claims.

What is claimed is:

1. A domain name resolution method based on a content delivery network, applicable to an authoritative domain name system, comprising:
receiving a domain name to be resolved transmitted by a local domain name system, wherein the domain name to be resolved is transmitted by a client to the local domain name system;
determining a target hosted zone based on a domain name suffix of the domain name to be resolved, wherein a plurality of first sub-domain names are recorded in the target hosted zone;
matching the domain name to be resolved with the plurality of first sub-domain names, and determining a first sub-domain name that matches the domain name to be resolved; and
determining a resolution result of the domain name to be resolved based on the first sub-domain name that matches the domain name to be resolved, and feeding back the resolution result to the local domain name system, wherein the local domain name system is configured to transmit the resolution result to the client.

2. The domain name resolution method according to claim 1, wherein the determining the target hosted zone based on the domain name suffix of the domain name to be resolved comprises:
determining a suffix with a maximum character length in the domain name suffix as a second sub-domain name of the domain name to be resolved; and
determining the target hosted zone based on the second sub-domain name.

3. The domain name resolution method according to claim 2, wherein the determining the target hosted zone based on the second sub-domain name comprises:
in response to determining that the hosted zone corresponding to the second sub-domain name exists in the authoritative domain name system, determining a hosted zone corresponding to the second sub-domain name as the target hosted zone.

4. The domain name resolution method according to claim 2, wherein the determining the target hosted zone based on the second sub-domain name comprises:
in response to determining that no hosted zone corresponding to the second sub-domain name exists in the authoritative domain name system, determining a third sub-domain name based on the domain name suffix of the domain name to be resolved, wherein a character length of a domain name suffix of the third sub-domain name is less than a character length of a domain name suffix of the second sub-domain name; and
determining the target hosted zone based on the third sub-domain name.

5. The domain name resolution method according to claim 2, further comprising:
in response to determining that the target hosted zone does not exist in the authoritative domain name system, generating resolution failure information; and
feeding back the resolution failure information to the local domain name system.

6. The domain name resolution method according to claim 1, wherein the matching the domain name to be resolved with the plurality of first sub-domain names, and determining the first sub-domain name that matches the domain name to be resolved comprises:
matching the domain name to be resolved with the plurality of first sub-domain names; and
in response to determining that there exists a target sub-domain name among the plurality of first sub-domain names that matches the domain name to be resolved, using the target sub-domain name as the first sub-domain name that matches the domain name to be resolved.

7. The domain name resolution method according to claim 6, wherein the determining the resolution result of the domain name to be resolved based on the first sub-domain name that matches the domain name to be resolved comprises:
determining a target mapping address corresponding to the target sub-domain name based on a preset correspondence between the plurality of first sub-domain names and mapping addresses; and
using the target sub-domain name and the target mapping address as the resolution result of the domain name to be resolved.

8. The domain name resolution method according to claim 7, wherein the using the target sub-domain name and the target mapping address as the resolution result of the domain name to be resolved comprises:
identifying whether the target sub-domain name is a domain name to be hidden; and
in response to identifying that the target sub-domain name is not a domain name to be hidden, using the target sub-domain name and the target mapping address as the resolution result of the domain name to be resolved.

9. The domain name resolution method according to claim 7, further comprising:
identifying whether the target sub-domain name is a domain name to be hidden; and
in response to identifying that the target sub-domain name is a domain name to be hidden, hiding the target sub-domain name, and using the target mapping address as the resolution result of the domain name to be resolved.

10. The domain name resolution method according to claim 7, further comprising:
determining a Time To Live (TTL) of the target sub-domain name; and
adding the TTL to the resolution result of the domain name to be resolved.

11. The domain name resolution method according to claim 10, wherein the determining the TTL of the target sub-domain name comprises:
in response to determining that the target sub-domain name includes a plurality of matching domain names, using a minimum value of TTLs of the matching domain names as the TTL of the target sub-domain name.

12. The domain name resolution method according to claim 1, wherein the matching the domain name to be resolved with the plurality of first sub-domain names, and determining the first sub-domain name that matches the domain name to be resolved comprises:
matching the domain name to be resolved with the plurality of first sub-domain names; and
in response to determining that there exists no target sub-domain name among the plurality of first sub-domain names that matches the domain name to be resolved, re-determining the target hosted zone.

13. The domain name resolution method according to claim 1, wherein the feeding back the resolution result to the local domain name system comprises:
in response to determining that the authoritative domain name system has multiple levels, feeding back a resolution result from the last level of the authoritative domain name system to the local domain name system.

14. The domain name resolution method according to claim 1, wherein each of the plurality of first sub-domain names is a complete sub-domain name.

15. The domain name resolution method according to claim 1, wherein the matching the domain name to be resolved with the plurality of first sub-domain names, and determining the first sub-domain name that matches the domain name to be resolved comprises:
in response to determining that the target hosted zone is a domain name that requires domain name resolution acceleration, query the first sub-domain name matching the domain name to be resolved in the target hosted zone.

16. An electronic device, comprising:
a memory and a processor, the memory and the processor being communicatively connected to each other, the memory having stored therein computer instructions, and the processor executing the computer instructions to perform a domain name resolution method comprising:
receiving a domain name to be resolved transmitted by a local domain name system, wherein the domain name to be resolved is transmitted by a client to the local domain name system;
determining a target hosted zone based on a domain name suffix of the domain name to be resolved, wherein a plurality of first sub-domain names are recorded in the target hosted zone;
matching the domain name to be resolved with the plurality of first sub-domain names, and determining a first sub-domain name that matches the domain name to be resolved; and
determining a resolution result of the domain name to be resolved based on the first sub-domain name that matches the domain name to be resolved, and feeding back the resolution result to the local domain name system, wherein the local domain name system is configured to transmit the resolution result to the client.

17. The electronic device according to claim 16, wherein the determining the target hosted zone based on the domain name suffix of the domain name to be resolved comprises:
determining a suffix with a maximum character length in the domain name suffix as a second sub-domain name of the domain name to be resolved; and
determining the target hosted zone based on the second sub-domain name.

18. The electronic device according to claim 17, wherein the determining the target hosted zone based on the second sub-domain name comprises:
in response to determining that no hosted zone corresponding to the second sub-domain name exists in the authoritative domain name system, determining a third sub-domain name based on the domain name suffix of the domain name to be resolved, wherein a character length of a domain name suffix of the third sub-domain name is less than a character length of a domain name suffix of the second sub-domain name; and
determining the target hosted zone based on the third sub-domain name.

19. A non-transitory computer-readable storage medium, with computer instructions stored thereon for causing a computer to perform a domain name resolution method comprising:
receiving a domain name to be resolved transmitted by a local domain name system, wherein the domain name to be resolved is transmitted by a client to the local domain name system;

determining a target hosted zone based on a domain name suffix of the domain name to be resolved, wherein a plurality of first sub-domain names are recorded in the target hosted zone;

matching the domain name to be resolved with the plurality of first sub-domain names, and determining a first sub-domain name that matches the domain name to be resolved; and determining a resolution result of the domain name to be resolved based on the first sub-domain name that matches the domain name to be resolved, and feeding back the resolution result to the local domain name system, wherein the local domain name system is configured to transmit the resolution result to the client.

20. The non-transitory computer-readable storage medium according to claim 19, wherein the determining the target hosted zone based on the domain name suffix of the domain name to be resolved comprises:

determining a suffix with a maximum character length in the domain name suffix as a second sub-domain name of the domain name to be resolved; and determining the target hosted zone based on the second sub-domain name.

* * * * *